United States Patent
Spiessens

(10) Patent No.: US 11,678,084 B2
(45) Date of Patent: Jun. 13, 2023

(54) IMAGE SENSORS WITH ADAPTIVE FILTERING FOR ROW NOISE MITIGATION

(71) Applicant: SEMICONDUCTOR COMPONENTS INDUSTRIES, LLC, Phoenix, AZ (US)

(72) Inventor: Peter Spiessens, Werchter (BE)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 158 days.

(21) Appl. No.: 16/949,179

(22) Filed: Oct. 19, 2020

(65) Prior Publication Data

US 2022/0124267 A1 Apr. 21, 2022

(51) Int. Cl.
| | | |
|---|---|---|
| *H04N 25/673* | (2023.01) | |
| *G06T 5/00* | (2006.01) | |
| *H04N 25/60* | (2023.01) | |
| *G06T 5/20* | (2006.01) | |
| *H04N 25/75* | (2023.01) | |
| *H04N 25/702* | (2023.01) | |

(52) U.S. Cl.
CPC ........... *H04N 25/673* (2023.01); *G06T 5/002* (2013.01); *G06T 5/20* (2013.01); *H04N 25/60* (2023.01); *H04N 25/702* (2023.01); *H04N 25/75* (2023.01); *G06T 2207/20081* (2013.01)

(58) Field of Classification Search
CPC .... H04N 5/3655; H04N 5/3696; H04N 5/378; H04N 5/357–3658; H04N 25/60; H04N 25/673; H04N 25/702; H04N 25/75; G06T 5/002; G06T 5/20; G06T 2207/20081
See application file for complete search history.

(56) References Cited

U.S. PATENT DOCUMENTS

| | | | |
|---|---|---|---|
| 7,839,438 B2 * | 11/2010 | Ahn | H04N 25/63 348/241 |
| 2009/0091641 A1 * | 4/2009 | Hattori | H04N 25/63 348/241 |
| 2009/0273691 A1 | 11/2009 | Mo et al. | |
| 2010/0020213 A1 | 1/2010 | Mauritzson | |
| 2010/0039537 A1 | 2/2010 | Oten et al. | |
| 2012/0212657 A1 * | 8/2012 | Mo | H04N 5/3658 348/300 |
| 2019/0191115 A1 * | 6/2019 | Yanagi | H04N 5/23203 |

\* cited by examiner

*Primary Examiner* — Lin Ye
*Assistant Examiner* — Chriss S Yoder, III
(74) *Attorney, Agent, or Firm* — Treyz Law Group, P.C.; Joseph F. Guihan

(57) ABSTRACT

An image sensor may include adaptive filtering circuitry that is used to correct for row noise. In one example, the image sensor may include a single reference pixel or a column of reference pixels that are shielded from incident light. The adaptive filtering circuitry may estimate row noise based on data from the reference pixel(s). Row noise correction circuitry may then subtract the estimated row noise from imaging pixel outputs to correct for row noise. If the row noise is dominated by supply noise, the reference pixels may be omitted entirely and the adaptive filtering circuitry may estimate row noise based only on the power supply voltage. The adaptive filtering circuitry may undergo a training phase to optimize coefficients for the adaptive filtering circuitry.

15 Claims, 4 Drawing Sheets

IMAGE SENSORS WITH ADAPTIVE FILTERING FOR ROW NOISE MITIGATION

BACKGROUND

This relates generally to image sensors and, more particularly, to image sensors that are susceptible to row noise.

Image sensors are commonly used in electronic devices such as cellular telephones, cameras, and computers to capture images. In a typical arrangement, an electronic device is provided with an array of image pixels arranged in pixel rows and pixel columns. Each image pixel in the array includes a photodiode that is coupled to a floating diffusion region via a transfer gate. Each pixel receives incident photons (light) and converts the photons into electrical signals. Column circuitry is coupled to each pixel column for reading out pixel signals from the image pixels. Image sensors are sometimes designed to provide images to electronic devices using a Joint Photographic Experts Group (JPEG) format.

Conventional image sensors are susceptible to row noise in the array of imaging pixels. Row noise refers to random noise that shifts the measured voltage levels for different rows. Row noise appears in a captured image as randomly distributed horizontal lines that appear lighter or darker than the surrounding background. Conventional techniques for mitigating row noise may be excessively costly or complex.

It would therefore be desirable to provide improved image sensors with row noise mitigation.

DETAILED DESCRIPTION

Figure 1:
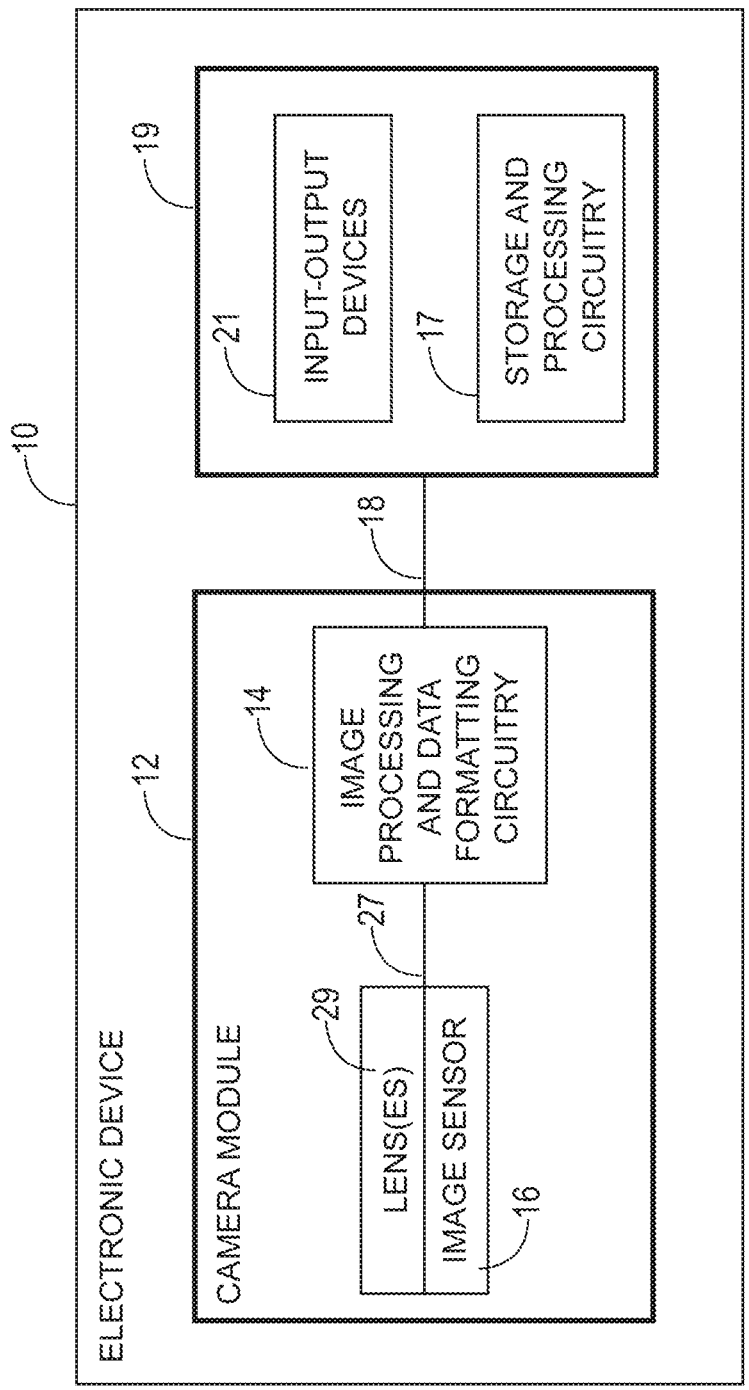
FIG. 1 is a schematic diagram of an illustrative electronic device that may include an image sensor in accordance with an embodiment.

Embodiments of the present invention relate to image sensors with adaptive filtering circuitry used to estimate row noise. An electronic device with a digital camera module is shown in FIG. 1. Electronic device 10 may be a digital camera, a computer, a cellular telephone, a medical device, or other electronic device. Camera module 12 (sometimes referred to as an imaging device) may include image sensor 16 and one or more lenses 29. During operation, lenses 29 (sometimes referred to as optics 29) focus light onto image sensor 16. Image sensor 16 includes photosensitive elements (e.g., pixels) that convert the light into digital data. Image sensors may have any number of pixels (e.g., hundreds, thousands, millions, or more). A typical image sensor may, for example, have millions of pixels (e.g., megapixels). As examples, image sensor 16 may include bias circuitry (e.g., source follower load circuits), sample and hold circuitry, correlated double sampling (CDS) circuitry, amplifier circuitry, analog-to-digital (ADC) converter circuitry, data output circuitry, memory (e.g., buffer circuitry), address circuitry, etc.

Still and video image data from image sensor 16 may be provided to image processing and data formatting circuitry 14 via path 27. Image processing and data formatting circuitry 14 may be used to perform image processing functions such as automatic focusing functions, depth sensing, data formatting, adjusting white balance and exposure, implementing video image stabilization, face detection, etc. For example, during automatic focusing operations, image processing and data formatting circuitry 14 may process data gathered by phase detection pixels in image sensor 16 to determine the magnitude and direction of lens movement (e.g., movement of lens 29) needed to bring an object of interest into focus.

Image processing and data formatting circuitry 14 may also be used to compress raw camera image files if desired (e.g., to Joint Photographic Experts Group or JPEG format). In a typical arrangement, which is sometimes referred to as a system on chip (SOC) arrangement, camera sensor 16 and image processing and data formatting circuitry 14 are implemented on a common integrated circuit. The use of a single integrated circuit to implement camera sensor 16 and image processing and data formatting circuitry 14 can help to reduce costs. This is, however, merely illustrative. If desired, camera sensor 16 and image processing and data formatting circuitry 14 may be implemented using separate integrated circuits. If desired, camera sensor 16 and image processing circuitry 14 may be formed on separate semiconductor substrates. For example, camera sensor 16 and image processing circuitry 14 may be formed on separate substrates that have been stacked.

Camera module 12 may convey acquired image data to host subsystems 19 over path 18 (e.g., image processing and data formatting circuitry 14 may convey image data to subsystems 19). Electronic device 10 typically provides a user with numerous high-level functions. In a computer or advanced cellular telephone, for example, a user may be provided with the ability to run user applications. To implement these functions, host subsystem 19 of electronic device 10 may include storage and processing circuitry 17 and input-output devices 21 such as keypads, input-output ports, joysticks, and displays. Storage and processing circuitry 17 may include volatile and nonvolatile memory (e.g., random-access memory, flash memory, hard drives, solid state drives, etc.). Storage and processing circuitry 17 may also include microprocessors, microcontrollers, digital signal processors, application specific integrated circuits, or other processing circuits.

Figure 2:
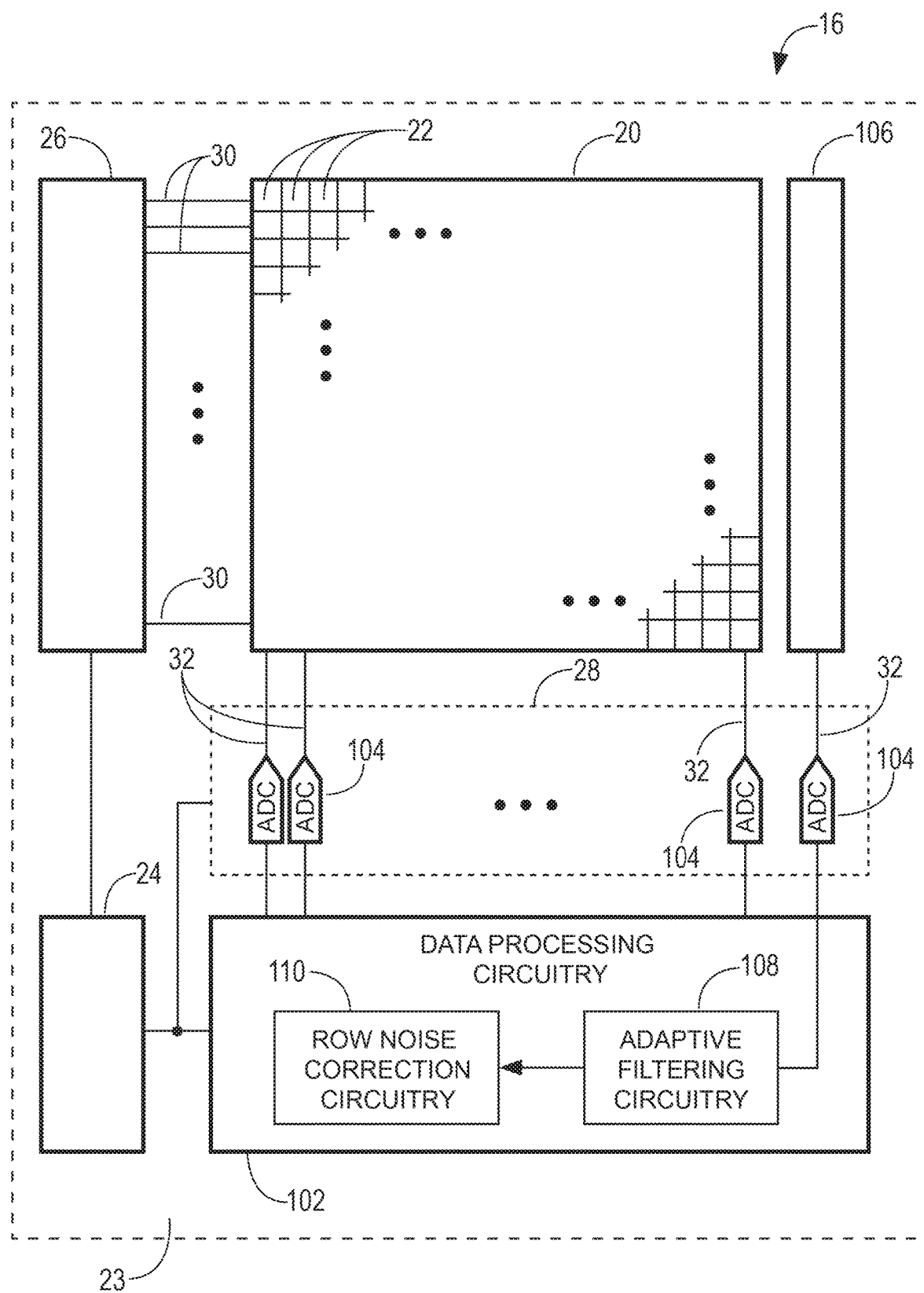
FIG. 2 is a diagram of an illustrative image sensor that includes an array of imaging pixels, at least one reference pixel, and adaptive filtering circuitry for row noise mitigation in accordance with an embodiment.

As shown in FIG. 2, image sensor 16 may include pixel array 20 containing image sensor pixels 22 arranged in rows and columns (sometimes referred to herein as image pixels or pixels) and control and processing circuitry 24 (which may include, for example, image signal processing circuitry). Image sensor pixels 22 may be complementary metal-oxide-semiconductor (CMOS) image sensor pixels or may be charge coupled device (CCD) image sensor pixels. Array 20 may contain, for example, hundreds or thousands of rows and columns of image sensor pixels 22. Control circuitry 24 may be coupled to row control circuitry 26, image readout circuitry 28 (sometimes referred to as column control circuitry, readout circuitry, processing circuitry, or column decoder circuitry), and/or data processing circuitry 102. Pixel array 20, control and processing circuitry 24, row control circuitry 26, data processing circuitry 102, and image readout circuitry 28 may be formed on a substrate 23. If desired, some or all of the components of image sensor 16 may instead be formed on substrates other than substrate 23, which may be connected to substrate 23, for instance, through wire bonding or flip-chip bonding.

Row control circuitry 26 may receive row addresses from control circuitry 24 and supply corresponding row control signals such as reset, row-select, charge transfer, dual conversion gain, and readout control signals to pixels 22 over row control paths 30. One or more conductive lines such as column lines 32 may be coupled to each column of pixels 22 in array 20. Column lines 32 may be used for reading out image signals from pixels 22 and for supplying bias signals (e.g., bias currents or bias voltages) to pixels 22. If desired, during pixel readout operations, a pixel row in array 20 may be selected using row control circuitry 26 and image signals generated by image pixels 22 in that pixel row can be read out along column lines 32.

Image readout circuitry 28 may receive image signals (e.g., analog pixel values generated by pixels 22) over column lines 32. Image readout circuitry 28 may include sample-and-hold circuitry for sampling and temporarily storing image signals read out from array 20, amplifier circuitry, analog-to-digital conversion (ADC) circuitry, bias circuitry, column memory, latch circuitry for selectively enabling or disabling the column circuitry, testing circuitry, or other circuitry that is coupled to one or more columns of pixels in array 20 for operating pixels 22 and for reading out image signals from pixels 22.

Array 20 may have any number of rows and columns. In general, the size of array 20 and the number of rows and columns in array 20 will depend on the particular implementation of image sensor 16. While rows and columns are generally described herein as being horizontal and vertical, respectively, rows and columns may refer to any grid-like structure (e.g., features described herein as rows may be arranged vertically and features described herein as columns may be arranged horizontally).

Pixel array 20 may be provided with a color filter array having multiple color filter elements which allows a single image sensor to sample light of different colors. As an example, image sensor pixels such as the image pixels in array 20 may be provided with a color filter array which allows a single image sensor to sample red, green, and blue (RGB) light using corresponding red, green, and blue image sensor pixels arranged in a Bayer mosaic pattern. The Bayer mosaic pattern consists of a repeating unit cell of two-by-two image pixels, with two green image pixels diagonally opposite one another and adjacent to a red image pixel diagonally opposite to a blue image pixel. In another suitable example, the green pixels in a Bayer pattern are replaced by broadband image pixels having broadband color filter elements (e.g., clear color filter elements, yellow color filter elements, etc.). These examples are merely illustrative and, in general, color filter elements of any desired color and in any desired pattern may be formed over any desired number of image pixels 22.

If desired, array 20 may be part of a stacked-die arrangement in which pixels 22 of array 20 are split between two or more stacked substrates. In such an arrangement, each of the pixels 22 in the array 20 may be split between the two dies at any desired node within the pixel. As an example, a node such as the floating diffusion node may be formed across two dies. Pixel circuitry that includes the photodiode and the circuitry coupled between the photodiode and the desired node (such as the floating diffusion node, in the present example) may be formed on a first die, and the remaining pixel circuitry may be formed on a second die. The desired node may be formed on (i.e., as a part of) a coupling structure (such as a conductive pad, a micro-pad, a conductive interconnect structure, or a conductive via) that connects the two dies. Before the two dies are bonded, the coupling structure may have a first portion on the first die and may have a second portion on the second die. The first die and the second die may be bonded to each other such that first portion of the coupling structure and the second portion of the coupling structure are bonded together and are electrically coupled. If desired, the first and second portions of the coupling structure may be compression bonded to each other. However, this is merely illustrative. If desired, the first and second portions of the coupling structures formed on the respective first and second dies may be bonded together using any metal-to-metal bonding technique, such as soldering or welding.

As mentioned above, the desired node in the pixel circuit that is split across the two dies may be a floating diffusion node. Alternatively, the desired node in the pixel circuit that is split across the two dies may be the node between a floating diffusion region and the gate of a source follower transistor (i.e., the floating diffusion node may be formed on the first die on which the photodiode is formed, while the coupling structure may connect the floating diffusion node to the source follower transistor on the second die), the node between a floating diffusion region and a source-drain node of a transfer transistor (i.e., the floating diffusion node may be formed on the second die on which the photodiode is not located), the node between a source-drain node of a source follower transistor and a row select transistor, or any other desired node of the pixel circuit.

In general, array 20, row control circuitry 26, column control and readout circuitry 28, and data processing circuitry 102 may be split between two or more stacked substrates. In one example, array 20 may be formed in a first substrate and row control circuitry 26, column control and readout circuitry 28, and data processing circuitry 102 may be formed in a second substrate. In another example, array 20 may be split between first and second substrates (using one of the pixel splitting schemes described above) and row control circuitry 26, column control and readout circuitry 28, and data processing circuitry 102 may be formed in a third substrate.

As shown in FIG. 2, image readout circuitry 28 may include a plurality of analog-to-digital converters (ADCs). Each ADC may be coupled to a respective column line 32 and may be configured to receive an analog signal from a corresponding column of pixels 22. The ADCs 104 may convert analog pixel values received from array 20 into corresponding digital pixel values (sometimes referred to as digital image data or digital pixel data). Image readout circuitry 28 may supply digital pixel data to data processing circuitry 102. Data processing circuitry 102 may perform additional data processing before ultimately providing the pixel data for pixels in one or more pixel columns to control and processing circuitry 24 over path 25.

In addition to the active pixels of array 20, image sensor 16 may include one or more reference pixels 106. Reference pixels 106 (sometimes referred to as dark pixels 106) may include photodiodes that are shielded to prevent the reference pixel photodiodes from being exposed to incident light, ensuring that any generated charge is merely noise. Dark pixels 106 may be covered by a shielding material (e.g., metal or any other desired material that is opaque to incident light). The dark pixels 106 may each include a photosensitive area and corresponding readout circuitry (e.g., a transfer transistor, source follower transistor, etc.). However, because the dark pixels are covered by the shielding material, any generated charge is the result of noise (not the intensity of incident light). The dark pixels may receive control signals from row control circuitry 26 to control operation of the dark pixels.

The signals from dark pixels 106 may be read out before, during, or after the signals from imaging pixels 22 are read out. The dark pixel values of all of the dark pixels (e.g., in multiple rows and/or columns) may be used to correct the imaging pixels. In other words, the average dark pixel level of all of the dark pixels may be used for noise correction.

In one example of noise correction, the determined average dark pixel level may be subtracted from a respective imaging pixel sample to correct for noise. However, in this type of noise correction scheme, a large number of dark pixels (e.g., 100 full columns or more) may be required to achieve desired noise correction levels.

To implement noise correction while reducing the number of dark pixels present in the image sensor, adaptive filtering may be used. As shown in FIG. 2, there may be one column of reference pixels 106 included in the sensor. This example is merely illustrative. In some cases, only one reference pixel may be included, a partial column of reference pixels (e.g., having fewer rows than in array 20) may be included, a full column of reference pixels (e.g., having the same number of rows as in array 20) may be included, or multiple columns of reference pixels (e.g., two columns, three columns, more than three columns, more than five columns, more than ten columns, less than fifty columns, less than ten columns, less than five columns, less than three columns, etc.) may be included.

The output from the reference pixel(s) may be sampled and converted to a digital value using a corresponding ADC 104 in readout circuitry 28. The average value from the reference pixels may then be used by adaptive filtering circuitry 108 to correct the outputs from pixels 22.

Because the measured noise in reference pixels 106 is correlated to the row noise experienced by imaging pixels 22, adaptive filtering circuitry 108 may use the average reference pixel output to estimate the amount of row noise present in the imaging pixels 22. Row noise correction circuitry 110 then uses the noise value from adaptive filtering circuitry 108 to correct the outputs from pixels 22.

For example, a first imaging pixel has a first output (PIX_OUT) that is converted to a digital value by ADC 104 and received by row noise correction circuitry 110. The output PIX_OUT includes a first component (SIGNAL) attributed to the magnitude of incident light during the integration time of the pixel and a second component (NOISE_ACTUAL) attributed to noise. In other words, PIX_OUT=SIGNAL+NOISE_ACTUAL. Adaptive filtering circuitry 108 may generate a value (NOISE_EST) that is approximately equal to NOISE_ACTUAL based on the raw data from the reference pixels. Row noise correction circuitry 110 therefore subtracts the estimated noise (NOISE_EST) from the output PIX_OUT to remove the noise component of the output signal. The result (PIX_CORR) may be approximately equal to the magnitude of incident light during the integration time of the pixel (without a substantial noise component). In other words, PIX_CORR=PIX_OUT−NOISE_EST. Substituting for PIX_OUT: PIX_CORR=SIGNAL+NOISE_ACTUAL−NOISE_EST. When the NOIST_EST value is approximately equal to NOISE_ACTUAL, PIX_CORR=SIGNAL. Therefore, the signal component of PIX_OUT is isolated using this row noise mitigation technique.

Adaptive filtering circuitry 108 may use an adaptive filter that is trained to correlate a measured noise level from reference pixels 106 to the noise level present in pixels 22. The adaptive filter may be trained using any desired technique (e.g., a least mean squares algorithm, a recursive least squares algorithm, etc.).

Data processing circuitry 102 may perform additional data processing functions before and/or after the row noise correction is complete. In general, any desired data processing may be completed in addition to the row noise correction.

Figure 3:
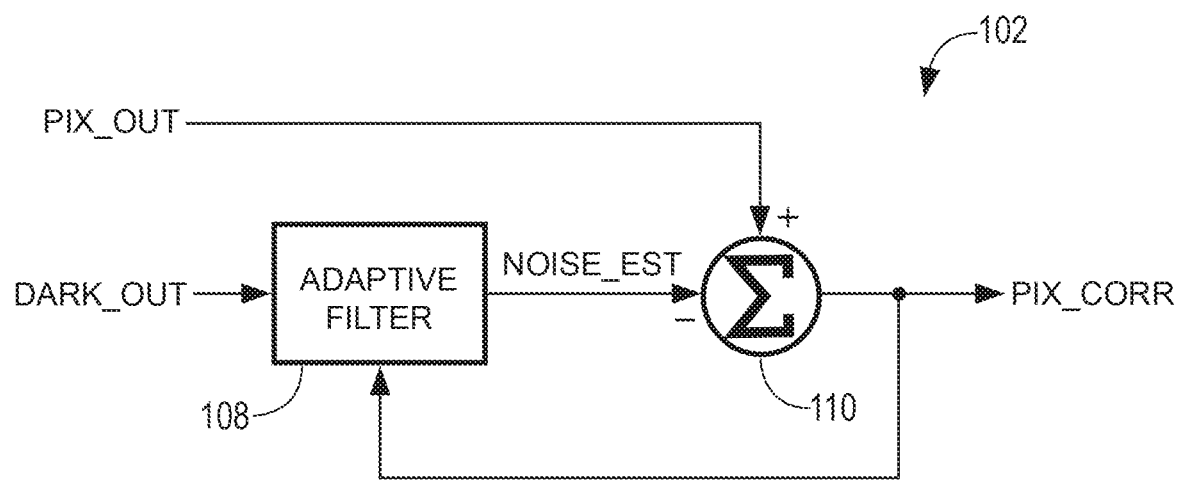
FIG. 3 is a schematic diagram of illustrative data processing circuitry including an adaptive filter that may be included in an image sensor of the type shown in FIG. 2 in accordance with an embodiment.

FIG. 3 is a schematic diagram showing illustrative data processing circuitry that includes an adaptive filter. As shown, adaptive filter 108 receives an input DARK_OUT. In some cases, DARK_OUT may be equal to a measurement from a single dark pixel 106. In other cases, DARK_OUT may be equal to an average of measurements from multiple dark pixels. In other words, DARK_OUT may be the average dark pixel level of all of the dark pixels included in the sensor. DARK_OUT may be a digital value having any desired number of bits.

During operation, adaptive filter 108 outputs a noise estimate NOISE_EST based on the input DARK_OUT. The noise estimate is approximately equal to the noise component in PIX_OUT. PIX_OUT represents an output value from an imaging pixel 22. Row noise correction circuitry 110 subtracts NOISE_EST from PIX_OUT to obtain a noise corrected pixel output PIX_CORR. The noise corrected pixel output PIX_CORR for a given pixel is proportional to the magnitude of incident light during the integration time of that pixel (without a substantial noise component).

Adaptive filter 108 may undergo a training phase (sometimes referred to as a calibration phase) to achieve desired filtering with the adaptive filter. During the training phase, a feedback loop feeds back the final output PIX_CORR (and/or the adaptive filter output NOISE_EST) back to the adaptive filter. The adaptive filter may also receive PIX_OUT in order to allow training of the adaptive filter. The feedback and inputs to the adaptive filter may be used to modify and optimize coefficients (parameters) in a transfer function that is used by the adaptive filter. Multiple rounds of training are used to update the parameters of the filter (e.g., using a least mean squares algorithm, a recursive least squares algorithm, etc.). Eventually, during training, the coefficients of adaptive filter 108 will converge upon the optimum values.

Once the optimum values for the adaptive filter coefficients are determined, the adaptive filter may be used during real-time operation to convert a measured DARK_OUT (from the reference pixels) to an estimate noise value NOISE_EST (as discussed above). The estimated noise value is then subtracted from the pixel value PIX_OUT to obtain a corrected pixel value PIX_CORR that may be used for subsequent processing.

As shown in FIG. 2, adaptive filtering circuitry 108 receives digital signals from ADCs 104 and therefore operates in the digital domain. As previously noted, readout circuitry 28 may include correlated double sampling (CDS) circuitry (configured to subtract a measured pixel reset level from a measured pixel signal level). Adaptive filtering circuitry 108 and row noise correction circuitry 110 may use the output signal PIX_OUT after correlated double sampling is complete. In other words, the input PIX_OUT may already be corrected using correlated double sampling.

Figure 4:
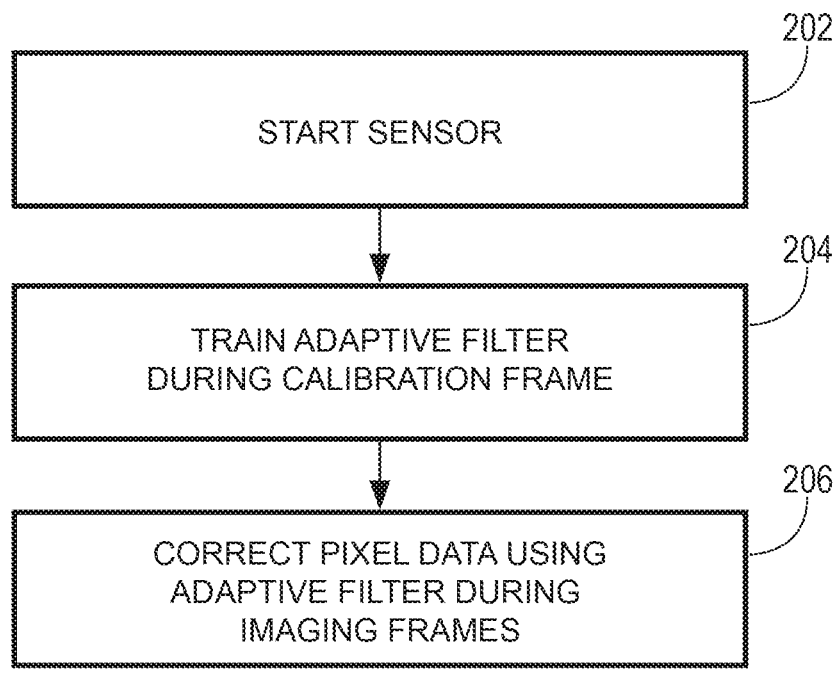
FIG. 4 is a flowchart showing illustrative method steps for operating an image sensor that includes adaptive filtering circuitry such as the image sensor of FIG. 2 in accordance with an embodiment.

FIG. 4 is a timing diagram showing an illustrative method for operating an image sensor of the type shown in FIG. 2 that includes adaptive filtering circuitry. As shown, at step 202 the image sensor may be started up (e.g., booted or powered on). After the image sensor is booted, the adaptive filter may be trained during step 204. The adaptive filter may be trained during a calibration frame. During the calibration frame, a test signal may be applied to the active pixel array (e.g., via analog test rows). The test signal may have any desired magnitude. The imaging pixels 22 may be operated in an electrically black equivalent mode (e.g., such that only signal associated with noise is generated during the frame). The data obtained during the calibration frame may then be used to train the adaptive filter 108. In other words, the output signals PIX_OUT from imaging pixels 22 during the calibration frame and the reference pixel output DARK_OUT may be used to optimize the coefficients of the adaptive filter. The corrected values PIX_CORR generated during the training phase may not be used to generate an image that is used by the imaging system (since the image sensor is not aiming to obtain useful imaging data during the calibration frame).

However, after the adaptive filter coefficients are optimized during the training of step 204, the adaptive filter may be used to cancel for row noise during imaging operations at step 206. In step 206, normal imaging operations may be performed where, for a given imaging frame, imaging pixels 22 and reference pixel(s) 106 capture data. The data (e.g., a single value or an average value) from the reference pixel(s) may be fed as an input to the adaptive filter 108. The adaptive filter may output a row noise estimate (NOISE_EST) based on the input. The row noise estimate is then subtracted from the pixel outputs PIX_OUT to generate corresponding corrected pixel data PIX_CORR.

Using adaptive filtering to estimate row noise for the image sensor may reduce the number of reference pixels that are required in the image sensor. The adaptive filtering may estimate row noise with a sufficiently high degree of accuracy based on data from only a small number of reference pixels (e.g., a column of reference pixels, a single reference pixel, etc.). Therefore, only a small amount of space in the image sensor needs to be dedicated to the reference pixels. Without adaptive filtering, a far higher number of reference pixels would need to be included to achieve the same magnitude of noise mitigation.

In some image sensors, the row noise experienced by the imaging pixels 22 in image sensor 16 is dominated by supply noise. Supply noise refers to fluctuations in the power supply voltage that is used to provide power to imaging pixels 22. These fluctuations may be the primary driver of row noise in the pixels. In other words, the supply noise may be correlated to the row noise in the pixels. Adaptive filtering techniques may be used in this scenario without the need for reference pixels.

Figure 5:
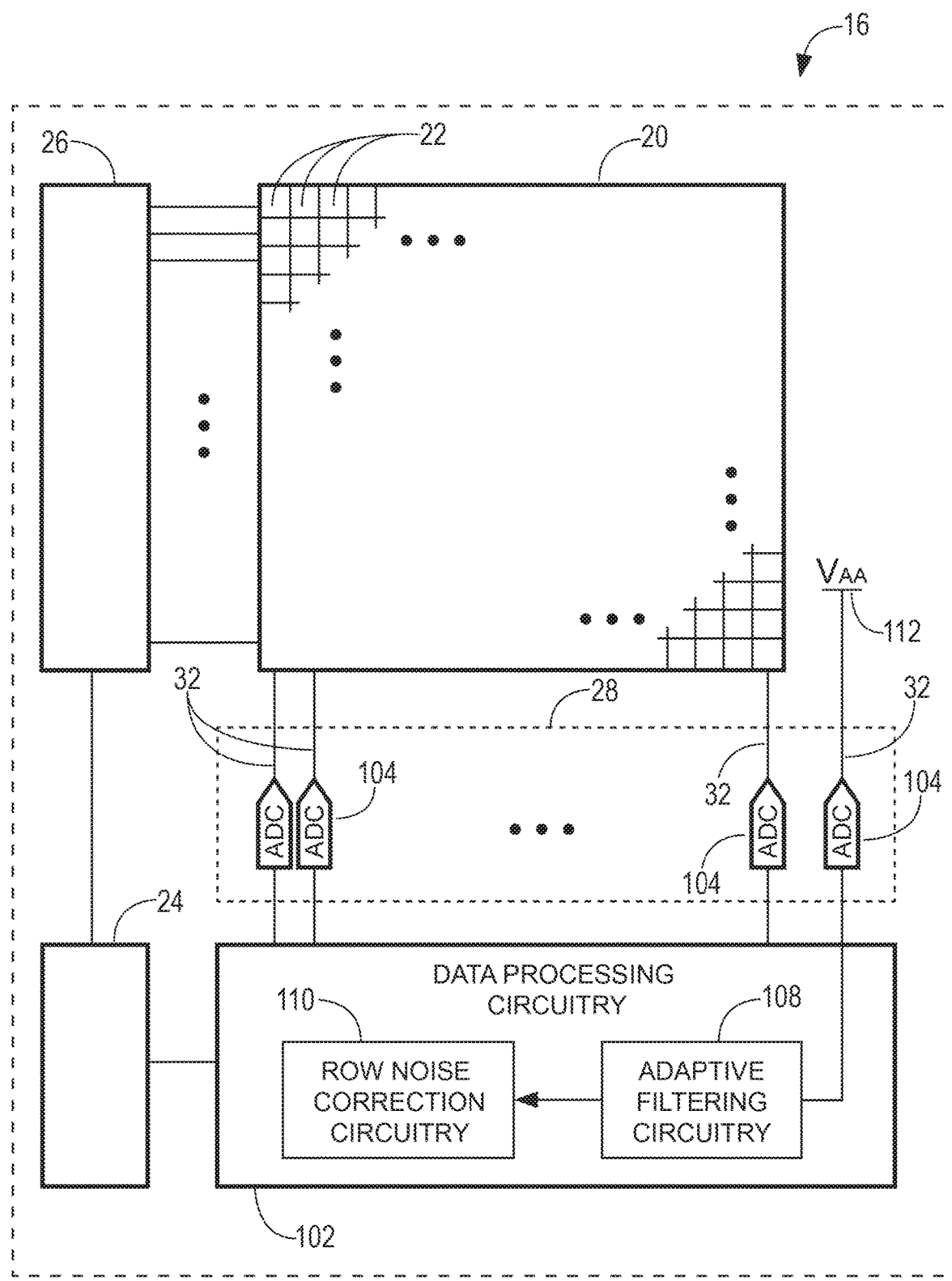
FIG. 5 is a diagram of an illustrative image sensor that includes an array of imaging pixels, a power supply terminal, and adaptive filtering circuitry that corrects for row noise based on the power supply voltage at the power supply terminal in accordance with an embodiment.

FIG. 5 is a schematic diagram of an illustrative image sensor with adaptive filtering circuitry that determines row noise based on measured power supply noise. As shown, no reference pixels are included in the image sensor of FIG. 5. Instead, the magnitude of a power supply voltage $V_{AA}$ (received from voltage supply terminal 112) is measured by a respective ADC 104. The digital measurement of the power supply voltage is provided to adaptive filtering circuitry 108.

Adaptive filtering circuitry 108 may operate similar to as discussed above in connection with FIGS. 2-4, only using the supply voltage as an input instead of the reference pixel data (DARK_OUT). Adaptive filtering circuitry 108 may use the power supply voltage measurement (and corresponding PIX_OUT measurements) to optimize the adaptive filter coefficients during a training phase. Then, during imaging operations, adaptive filtering circuitry 108 may use the measurement of supply voltage $V_{AA}$ to estimate row noise.

The foregoing is merely illustrative and various modifications can be made to the described embodiments. The foregoing embodiments may be implemented individually or in any combination.

What is claimed is:

1. An image sensor comprising:
    an array of imaging pixels;
    at least one reference pixel that is shielded from incident light;
    adaptive filtering circuitry configured to receive data from the at least one reference pixel, wherein the adaptive filtering circuitry is configured to:
        undergo a training phase during a calibration frame for coefficients of an adaptive filter; and
        use the coefficients during subsequent imaging frames to provide outputs that represent row noise estimates; and
    row noise correction circuitry configured to correct pixel values from the array of imaging pixels based on the outputs from the adaptive filtering circuitry.

2. The image sensor defined in claim 1, wherein undergoing the training phase for the coefficients of the adaptive filter comprises undergoing the training phase for the coefficients of the adaptive filter according to a least mean squares algorithm.

3. The image sensor defined in claim 1, wherein undergoing the training phase for the coefficients of the adaptive filter comprises undergoing the training phase for the coefficients of the adaptive filter according to a recursive least squares algorithm.

4. The image sensor defined in claim 1, wherein the adaptive filtering circuitry is configured to provide the outputs that represent row noise estimates based on data from a single reference pixel.

5. The image sensor defined in claim 1, wherein the adaptive filtering circuitry is configured to provide the outputs that represent row noise estimates based on data from multiple reference pixels.

6. The image sensor defined in claim 5, wherein the adaptive filtering circuitry is configured to provide the outputs that represent row noise estimates based on an average of respective outputs from the multiple reference pixels.

7. The image sensor defined in claim 1, wherein the at least one reference pixel includes no more than a single reference pixel.

8. The image sensor defined in claim 1, wherein the at least one reference pixel includes no more than a single column of reference pixels.

9. An image sensor comprising:
    an array of imaging pixels;
    at least one reference pixel that is shielded from incident light;
    adaptive filtering circuitry configured to receive data from the at least one reference pixel, wherein the adaptive filtering circuitry is configured to undergo a training phase for coefficients of an adaptive filter according to a recursive least squares algorithm; and row noise correction circuitry configured to correct pixel values from the array of imaging pixels based on an output from the adaptive filtering circuitry.

10. The image sensor defined in claim 9, wherein the output is an estimate of row noise.

11. The image sensor defined in claim 10, wherein the adaptive filtering circuitry provides the estimate of row noise based on data from a single reference pixel.

12. The image sensor defined in claim 10, wherein the adaptive filtering circuitry provides the estimate of row noise based on data from multiple reference pixels.

13. The image sensor defined in claim 12, wherein the adaptive filtering circuitry provides the estimate of row noise based on an average of respective outputs from the multiple reference pixels.

14. The image sensor defined in claim 9, wherein the at least one reference pixel includes no more than a single reference pixel.

15. The image sensor defined in claim 9, wherein the at least one reference pixel includes no more than a single column of reference pixels.

* * * * *